United States Patent Office 3,203,917
Patented Aug. 31, 1965

3,203,917
PIGMENT RESIN PRINTING PASTE COMPRISING A BROMINATED VINYL POLYMER
Seijiro Yoshida, Ashiya-shi, Shozo Naito, Toyonaka-shi, Shigeo Ito, Sakai-shi, and Shigeru Tajima, Ashiya-shi, Japan, assignors to Sumitomo Chemical Company, Ltd., Osaka, Japan, a corporation of Japan
No Drawing. Filed Sept. 28, 1961, Ser. No. 141,306
Claims priority, application Japan, Sept. 30, 1960, 35/40,400
9 Claims. (Cl. 260—29.4)

This invention relates to a new pigment resin printing paste containing the emulsion of a high molecular compound having active bromine atom as binder. More particularly, this invention relates to a new pigment resin printing paste which contains the emulsion of a high molecular compound having active bromine atom as binder, the said high molecular compound being obtained by the partial bromination of either unsaturated polymer formed through the polymerization of 1,3-diolefinic monomer or unsaturated copolymer formed through the copolymerization of the said monomer with other ethylenically unsaturated monomer.

The use of emulsions containing a variety of high molecular compounds as binders of pigment resin printing pastes has been heretofore known. However, the emulsion of a high molecular compound containing active bromine atom as the binder has never been used heretofore. The use of a binder containing a high molecular compound having active bromine atom according to the present invention has the following advantages. That is, the binder resin of the present invention can be readily prepared, and in addition, a pigment resin printing paste containing the said binder can provide printed articles which are superior in color value, brilliancy, "handling," and dry or wet crock fastness to those obtained by use of conventional available printing pastes and which have high fastness against water-washing and laundry, especially against heavy washing. Furthermore, the pigment resin printing paste containing the binder of the present invention has broader adaptability to cellulosic fiber articles as well as synthetic fiber articles, particularly including those of polyamide, polyester, polyacrylic and polypropylene types or the mixed-spun or mixed-woven products thereof, whereas the conventionally known printing pastes, even if they have good adaptability to cellulosic fiber articles, occasionally fail to meet requirements for adapting to synthetic fiber articles.

It is accordingly one object of the present invention to provide a pigment resin printing paste containing a new and highly useful binder resin which has higher ability of fixing pigment onto substrate. Other objects and advantages will be apparent from the description and claims which follow.

The high molecular compounds having active bromine atom, which are used as binder in the present invention can be obtained by the addition reaction of bromine to chained high molecular compound having a plurality of carbon-carbon double bonds in its molecule. In the present invention, accordingly, a high molecular compound having active bromine is obtained by partial bromination of either a chained unsaturated polymer formed by the polymerization of 1,3-diolefinic monomer or a chained unsaturated copolymer formed by the copolymer of the said monomer with other ethylenically unsaturated monomer or monomers. 1,3-diolefinic monomers which can form unsaturated polymer to be brominated are $C_4$ to $C_5$-diolefinic hydrocarbons and the chlorine substituted derivatives thereof, and for example, butadiene, chloroprene, isoprene, etc. can be referred to.

With respect to the polymerization of these monomers having conjugated double bond, well researches have been made heretofore, and it is well known that the polymeric compounds obtained by the polymerization of these monomers have unsaturated bond in the straight chain and/or side chain of their chain molecules, regardless of the fact that the said polymerization is the reaction of either 1,4-addition or 1,2-addition. Ethylenically unsaturated monomers to be copolymerized with the said 1,3-diolefinic monomers include isobutylene, acrylonitrile, acrylic acid, methyl acrylate, styrene, vinyl chloride, vinylidene chloride, vinyl acetate, etc.

In the present invention where an unsaturated copolymer is used, the proportion of 1,3-diolefinic monomer and the above-said ethylenically unsaturated monomer (which may be one or more members) may be optionally selected within the considerably wide range, but usually 1,3-diolefinic monomeric unit should be present in an amount of more than 50 mol percent and preferably more than 70 mol percent in the copolymer molecule.

The various unsaturated polymers and copolymers as above-mentioned which are usable in the invention can be prepared according to a variety of recipes. However, it is convenient to employ some of commercially available so-called synthetic rubbers (before curing or vulcanization) which fall in the category of the above-defined polymers and copolymers. For instance, suitable as the unsaturated polymer are polybutadiene, polychloroprene and polyisoprene, and suitable as the unsaturated copolymer are binary or ternary copolymers, such as the copolymerization products of butadiene-acrylonitrile, butadiene-styrene, butadiene-acrylonitrile-styrene, isoprene-isobutirene, chloroprene-styrene, chlorophene-isoprene or chloroprene-acrylonitrile, provided that these copolymers contain more than 50 mol percent of 1,3-diolefinic monomer unit.

The bromination of such unsaturated high molecular compounds can be carried out according to any of the conventional procedures for the bromination of compounds having carbon-carbon double bond. Concretely speaking, a high molecular compound as defined above is dissolved in a solvent which is inert to halogen but can dissolve the compound at least partially, and bromine or a solution thereof is added dropwise to the solution of the compound with stirring at the ordinary temperature. Suitable as the solvent are hydrocarbon solvents and halogenated hydrocarbon solvents. For example, benzene, chlorobenzene, carbon tetrachloride, dichloroethylene, trichloroethylene, tetrachloroethylene, cyclohexane and mixtures thereof can be referred to.

After completion of the addition of bromine to the solution containing the unsaturated high molecular compound, unreacted bromine is removed off under a reduced pressure. Prior to this removal, however, it is recommendable to carry out the determination of the quantity of bromine combined. For this purpose, a part of the bromination reaction mixture is diluted with a solvent, e.g., carbon tetrachloride, and then the diluted solution is titrated with N/10 aqueous sodium thiosulfate solution in the presence of starch indicator to determine the quantity of unreacted bromine. The balance between the amount of bromine added for the reaction and that of unreacted bromine is equal to the amount of combined bromine. From the amount of combined bromine and that of the high molecular compound used, degree of the bromination can be evaluated.

In the present invention, the bromine amount of a high molecular compound having active bromine may vary over a wide range, depending upon the intended purpose. However, if the said bromine amount exceeds 25.0 mol percent per mole of the polymerizable monomer unit in the said polymer, the resulting binder resin would be hard and brittle, and, accordingly, pigment resin printing pastes obtained by use of the binder resin are practically of no utility because it only gives printed articles having markedly poor fastness against abrasion and heavy washing. If the degree of bromination is lower than 3.0 mol percent, unsatisfactory results are obtained. The suitable binder resin has to have the degree of bromination ranging from 3.0 to 25.0 mol percent per mole of the polymerizable monomer unit in the polymer. When a pigment resin printing paste is prepared by use of a binder resin having the above-specified degree of bromination, it can provide printed articles having high crock fastness, good fastness against heavy washing and high color value.

The solution of a high molecular compound having active bromine, from which unreacted bromine has been removed, may be used directly, or after adjustment of its concentration by addition of a solvent, as binder resin solution for the preparation of a printing paste. The concentration may be optionally selected, but a concentration of 10–30% is preferable. In some cases, the solution is directly emulsified and is used as binder resin emulsion, for the preparation of printing pastes. The emulsion may be in either form of O/W or W/O type. In the preparation of such emulsion, as well known in the art, H.L.B. value of surface active agent to be used, proportion of individual components and sequence of addition can be optionally selected. For instance, a surface active agent having the H.L.B. value of 9 to 20 is added to water and then a petroleum solvent, e.g., kerosine, is added thereto with stirring by means of a homomixer. To the mixture while kept in the emulsified state by stirring, the binder resin solution is added, thereby to obtain an O/W-type emulsion. Alternatively, a surface active agent having the H.L.B value of 2–6 is added to a petroleum solvent and thereto is added the binder resin solution. To the mixture while being stirred by means of a homomixer, water is added, thereby to obtain a W/O-type emulsion. The concentration of the high molecular compound having active bromine in the emulsion may vary within the considerably wide range, but preferably it should be 0.5–20% by weight, especially 2–10% by weight.

It is recommendable to add, to the binder resin emulsion containing the high molecular compound having active bromine, 1–5% by weight, based upon the weight of the resin, of a stabilizer. Suitable as the stabilizer are epoxy compounds (e.g., aliphatic epoxy compound such as phenyl glycidyl ether or glycidyl ether of ethylene glycol, the condensate of bisphenol A and epichlorohydrin, etc.), metal soaps (e.g., barium soap, cadmium soap, etc.) and organo-tin compounds (e.g., dibutyltin maleate, dibutyltin laurate). These compounds generally are added to a solution of the high molecular compound having active bromine, before the said solution is emulsified.

Surface active agents which may be used for the preparation of the emulsion usually are non-ionic surface active agents. Typical examples are the aliphatic alcohol ethers as well as aliphatic carboxylic acid esters of polyethylene glycol, alkylphenyl ethers of polyethylene glycol, fatty acid esters of sorbitan and polyethylene glycol ether thereof. In the present invention, however, anionic surface active agents, such as the salts of aliphatic alcohol-sulfuric acid ester, can also be used, according to nature of the other components to be combined.

A pigment resin printing paste of the present invention which contains the above-mentioned high molecular compound having active bromine as the binder resin component can exhibit well-developed features. If desired, however, other binder resins heretofore known may conveniently be jointly used in the said printing paste to have combined characteristics of the individual components. Typical examples of the auxiliary binder resin components are the partial acetalizates obtained by the reaction of polyvinyl alcohol with acrolein, so-called dimeric acid obtained by the dimerization of drying oil-fatty acid or the polyol esters thereof, acetal resins, ketone resins and various types of aminoplasts and the mixture of those. Such binder resins may be mixed with the above-said solution containing the high molecular compound having active bromine to form an emulsion, or the auxiliary binder resins emulsion or solution is separately prepared which is then mixed to the emulsion of the high molecular compound having active bromine.

The pigment resin printing paste of the present invention may also additionally contain a thermoplastic resin latex. This is preferred in the event that the binder having the low degree of bromination is used. For the purpose, butadiene-acrylonitrile copolymer latex or the latice of homopolymers of vinyl acetate, vinyl chloride, acrylic acid ester, methacrylic acid ester, acrylonitrile, styrene, vinylidene chloride or butadiene as well as of copolymers of more than two of these monomers. These are easily available commercially. By use of the printing paste additionally containing such thermoplastic resin latex, printed articles can be produced, which have improved crock fastness, high color value and improved "handling." The said latex may be present in an amount up to the equal weight or more as compared with weight of the binder resin.

The characteristics of the pigment resin printing paste, which contains the high molecular compound having active bromine or the mixture thereof with other binder resin, can be further developed by joint use of a cross-linking agent. Polybasic compounds, such as polyamines including ethylene diamine, diethylene triamine, triethylene tetramine, tetraethylene pentamine, 3,3'-imino-bis-propylamine, tris-(3-aminopropyl) amine, 1,4-diaminobutane, 3,3'-methylimino-bis-propyl amine, N-(3-hydroxypropyl)-aminopropyl amine and N-(2-hydroxyethyl)aminopropyl amine, may be added singly or in combination to the printing paste in an amount up to the approximately equal weight to provide printed articles having improved fastness against heavy washing.

In the most preferred embodiment of the present invention, the printing paste concerned may additionally contain a cationic aminoplast. The cationic aminoplast is capable of playing both roles as the above-said cross-linking agent and as the auxiliary binder, and by joint use of such cationic aminoplast, the printed articles are markedly improved in color value brilliancy, "handling," dry or wet crock fastness, and fastness against water-washing and laundry, especially heavy washing. Typical cationic aminoplasts are cationic melamine-formaldehyde resin and cationic urea-formaldehyde resin. These can be obtained by addition of a basic polyamine or the condensation product thereof to melamine- or urea-formaldehyde condensate. In the more preferred embodiment, use of a polyhydric alcohol-modified cationic aminoplast is preferable. Such cationic melamine-formaldehyde resins as well as polyhydric alcohol-modified cationic melamine-formaldehyde resins as referred to hereinabove can be conveniently prepared according to the methods and their variations disclosed in U.S.P. 2,769,796, 2,796,362 and 2,856,314.

The cationic melamine-formaldehyde resins are such reaction products, wherein formaline is within a molar ratio of 3 to 12 moles per mole of melamine, and a polyfunctional aliphatic polyamine or a condensation product thereof is used in such an amount as providing about 0.3 to 10 basic nitrogen atoms per mole of melamine, the said reaction products being obtained through condensation reaction up to various degree of condensation. Polyhydric alcohol-modified cationic melamine resins are the co-reaction products from the said cationic melamine resins and polyhydric alcohols.

In order for the preparation of the former resins, the whole amount of melamine and a part of formaldehyde (usually 1.5–5 moles per mole of melamine) are reacted at the first place at neutral or slightly alkaline pH. At the stage where the resulting precondensate has desired degree of hydrophobic property, the remainder formaldehyde together with polyamine modifying agent are added. The stage, at which the desired degree of hydrophobic property is reached, can be recognized by immediate formation of white precipitate upon addition of a portion of the condensate into water at 0° C. Then the reaction system is acidified with a suitable acid (acetic acid, hydrochloric acid, etc.) to have a pH of about 2–6. Then the condensation is continued at about 50°–90° C. to yield a resinous syrup having the desired degree of condensation. The end point of the condensation reaction can be confirmed by the determination of the viscosity of the said resinous syrup. In the known method for the preparation of cationic melamine resin, a resinous syrup having the viscosity of 20–800 cp. is neutrailzed. Or, during the neutralization or at the stage before or after the neutralization, 8–30 moles of formaldehyde per mole of melamine may be added to the said resin.

For the preparation of polyhydric alcohol-modified melamine resin, the said resinous syrup is neutralized and, then, about 8–12 moles of polyhydric alcohol are added thereto. The reaction is continued at 20°–100° C. for several hours. The polyhydric alcohol should be added in an amount of 50% to 500% based upon the total solids of the syrupy resin. Preferably, 100% to 300% by weight of polyhydric alcohol is used. The cationic aminoplast thus obtained has 15 to 50% solids.

In the present invention, cationic melamine resins prepared according to any of the above-mentioned known methods may be used. More preferably, however, polyhydric alcohol-modified cationic melamine resins which are prepared by somewhat modified process and have improved properties, may be employed in the present invention, said process comprising further increasing the degree of condensation of the resin syrup mentioned above to the level of exhibiting Weisenberg's effect or the level of gel (viscosity in this case is unmeasurable but it is probably more than 10,000 cp. at the reaction temperature), adding about 8 to 12 moles of a polyhydric alcohol to the syrup, adjusting the pH to 3 to 6, and heating the syrup to a temperature of 50° to 100° C. for several hours. The polyhydric alcohol-modified cationic melamine resins which has been condensed to at least such an extent that the resin exhibits Weisenberg's effect have a higher fixing ability to fabrics and higher synergistic action with the binder resin of the present invention, as compared with those of the conventionally known cationic melamine resin and polyhydric alcohol-modified mass thereof. The term "Weisenberg's effect" used herein means such a state wherein a liquid creeps up around a stirrer and is projected around the stirrer at the center. For the cationic modification of the melamine-formaldehyde reaction product, polyamines or the condensation products thereof can be used, and such polyamines include those compounds which are referred to as the afore-mentioned cross-linking agents.

As the condensation products of polyamines, there are referred the condensation products of ammonia or polyfunctional amines (such as the above-said polyamines) with difunctional halohydrins, reaction products of tertiary alkanol amines (e.g., triethanol amine) with aldehydes (e.g., formaldehyde), and the like.

Among the polyhydric alcohols used are glycerol, ethylene glycol, diethylene glycol, propylene glycol, dipropylene glycol, triethylene glycol and tetraethylene glycol.

These polyhydric alcohols can be used singly or in combination. Trimethylolpropane, trimethylolethane, pentaerythritol, dipentaerythritol and alkanediol (e.g., butanediol, hexanediol-1,6, etc.) are similarly used, and especially they are jointly used in combination with one or more of the aforementioned polyols.

In order for the application of the cationic aminoplast resin thus prepared to the printing paste of the present invention, this resin solution is added to the emulsion of the said high molecular compound having active bromine atom in such an amount that the high molecular compound is in one-third to three times amount (by weight) of the aminoplast, calculated as the resin solid, and the resulting mixture is used for preparation of the printing paste in the known manner. In this case, cationic aminoplast prepared by any of the above-indicated methods can be used with the same effect, but the one which, at the stage of condensation, has been condensed to a gel state (more than 10000 cp.) is satisfactorly used for production of printed articles having outstanding wet crock fastness.

Thus, when a cross-linking agent or a cationic aminoplast is combined to the pigment resin printing paste containing the high molecular compound having active bromine atom as binder resin, these components seem to react with each other partially upon heat-treatment, and this fact is apparent from the development of new absorption zone in infra-red absorption spectrum. Accordingly, the pigment-fixing property of the pigment resin printing paste can be markedly increased by combining a cross-linking agent or a cationic aminoplast thereto.

The cross-linking agent or cationic aminoplast may be mixed in the form of a solution with a binder resin solution before emulsification, or it is mixed with a binder resin emulsion, to produce a printing paste. When using the cationic aminoplast, it is preferably used in an amount (as solid) of one-third to three times of the high molecular compound having active bromine atom.

For preparation of the pigment resin printing paste of the present invention, various agents may be further added to the above-said O/W type or W/O type emulsion containing the high molecular compound having active bromine atom. For example, water, a petroleum solvent or an emulsion (from a petroleum solvent, water and the aforesaid emulsifying agent) may be added to adjust the proportion of components in the printing paste or the viscosity of the said paste. If required, a solution of a water-soluble solid pasty material, e.g., tragacanth gum, British gum, carboxymethyl-cellulose, starch, etc., may be further added. The amount and type of the additive used depends upon the viscosity required for the final pigment resin printing paste product.

It is recommendable to add a small amount of a water-soluble, weakly basic compound as buffer agent, e.g., sodium acetate, mono- or poly-amine, urea, dicyandiamide, etc., to the pigment resin printing paste of the present invention. This is particularly effective when the printing paste is applied to cellulosic fiber materials. The aforesaid aminoplast also can play a role as buffer agent at the same time. The amount of such buffer agent may amount up to three times amount, based on that of the binder resin.

Pigments which are used in the pigment resin printing paste of the present invention are those commonly used in the conventional printing pastes, and they are formulated in the same manner as in the prior art. If the printing paste of the present resin is combinedly used with naphthol dye, stannous chloride and acetic acid as resisting agent, for example, can be preferably added to the paste. Particularly for the purpose of color resist for Variamin blue, tartaric acid may be formulated in the paste.

The pigment resin printing pastes thus obtained can be printed onto fabrics in the various known manner as by mechanical printing, screen printing, etc. The said printing pastes can be applied not only to cellulosic fiber materials, but also to polyamide, polyester, polyacrylic and polypropylene fibers or mixed-spun or mixed woven fabrics from these fibers with cellulosic fibers, thereby providing satisfactory results.

After the printing, the printed fabrics usually are subjected to cylinder drying (e.g., 100°–110° C.) and heat-treated in the known manner to set or fix the paste on the fabrics. For example, either of dry heat treatment at a temperature of about 120°–150° C. or immersion in an aqueous alkali solution at 80°–90° C. is effected. With respect to this setting, detailed explanations would not be necessary because the process is apparent by those skilled in the art.

Now the present invention will more fully be explained in connection with the following examples, which are illustrative only and not to be construed as limiting the scope of the invention. Parts and percentages in the examples are by weight, unless otherwise specified.

*Example 1*

Two hundred parts of poly-2-chlorobutadiene (neoprene WRT manufactured by Du Pont) is dissolved in 553.5 parts of monochlorobenzene. While stirring the solution at 30°–35° C., 31.2 parts of bromine is added. Bromination reaction is continued for 4 hours. At the end of that time, a part of the reaction mixture is recovered and diluted with carbon tetrachloride, and then the diluted solution is titrated with N/10 aqueous sodium thiosulfate solution in the presence of starch indicator to determine the quantity of unreacted bromine. It is found that the poly-2-chlorobutadiene has been brominated by 8.3 mol percent. After removal of the unreacted bromine under a reduced pressure, the reaction mixture is mixed with 200 parts of kerosine and 5 parts of phenyl glycidyl ether to have a solution containing 23% solids. The brominated poly-2-chlorobutadiene solution thus obtained is emulsified as follows: Four parts of polyethylene glycol distearate (Emanon 3299 made by Kao Soap Mfg. Co., Ltd.) and 8.5 parts of ethyleneglycol lauryl ether (Neugen ET 170 manufactured by Daiichi Kogyo Seiyaku K.K.) is added to 300 parts of water and the mixture is stirred by means of a homomixer. To the resulting solution, the aforementioned brominated poly-2-chlorobutadiene solution, 426.3 parts, is gradually added to have O/W type emulsion of the brominated poly-2-chlorobutadiene. To 70 parts of the emulsion thus obtained, 10 parts of an aqueous paste containing 20% of a red color pigment is added, and, thereafter, 5 parts of sodium acetate and 15 parts of O/W type emulsion (obtained from water, kerosine and the above-indicated emulsifying agents) are added, thereby to have a printing paste. After printing onto the fabric, this paste is treated by heating at 120°–130° C. for 3 minutes. The finished fabric has a brilliant shade and a high color value, and particularly it is outstanding in "handling" on the printed part and it has an excellent crock fastness.

*Example 2*

To 60 parts of the brominated poly-2-chlorobutadiene emulsion of Example 1, 10 parts of an aqueous paste containing 30% of green color copper phthalocyanine pigment is added, and then 20 parts of 7% aqueous solution of the 40%-acetalizate obtained by the reaction of acrolein with an aqueous polyvinyl alcohol solution and finally 7 parts of water (if increased viscosity is desired, 7% aqueous solution of cellulose methyl ether) is added. The total mixture is stirred to have a printing paste. According to the same heat-treatment as in Example 1, the printing paste can produce a printed fabric having a brilliant shade, a high color value and good fastness (against water-washing).

*Example 3*

Fifty parts of butadiene-styrene copolymer (86.2:13.8 by mole percent) (Prioflex GR-S 1502, manufactured by Goodyear Tire & Rubber) is dissolved in a mixed solvent of 78 parts of kerosine and 200 parts of monochlorobenzene. While stirring the solution at 32°–35° C., 8 parts of bromine is added. Bromination reaction is continued for 2 hours during which 150 parts of kerosine are added. A solution of 5.8 mol percent brominated butadiene-styrene copolymer is obtained. The solution of the brominated butadienestyrene copolymer can be emulsified as followings: By means of a homo-mixer, 4 parts of polyethyleneglycol distearate (Emanon 3299) and 5 parts of polyoxyethylene lauryl ether (Emalgen 120, made by Kao Soap Mfg. Co.) are dissolved in 153.5 parts of water. To the resulting solution, 481 parts of the said brominated butadiene-styrene copolymer solution is slowly added. To 70 parts of the obtained O/W type emulsion of the brominated butadienestyrene copolymer, 10 parts of an aqueous paste containing 30% yellow color pigment is added, and then 5 parts of 50% aqueous dimethylol ethylene urea solution and 15 parts of water (or O/W type emulsion from water, kerosine and the above-indicated emulsifying agents) are also added thereby to have a printing paste.

The printing paste thus obtained can provide printed article having a high color value, a brilliant shade and good fastness against water-washing, after the heat-treatment as described in Example 1.

*Example 4*

To 70 parts of the brominated poly-2-chlorobutadiene emulsion, 8 parts of an aqueous paste containing 30% blue copper phthalocyanin pigment is added and then 3 parts of diethylene triamine and 19 parts of water (or O/W type emulsion prepared from water, kerosine and the emulsifiers of Example 1) also added. The resulting mixture is stirred to have a printing paste.

The printing paste thus obtained can produce printed fabrics having good dry and wet crock fastness, through the heat treatment according to Example 1. The printed parts are excellent in "handling."

*Example 5*

To 60 parts of the brominated poly-2-chlorobutadiene emulsion of Example 1, 10 parts of an aqueous paste containing 30% green color copper phthalocyanine pigment is added and then 3 parts of pentamethylol melamine methyl ether (80% aqueous solution) and 3 parts of dimethylol urea methyl ether (75% aqueous solution) also added. To the mixture, 24 parts of water (or O/W type emulsion comprising water, kerosine and the emulsifiers of Example 1) is added with stirring, thereby resulting a printing paste.

By using the printing paste in the same manner as in Example 1, printed fabrics having a brilliant shade and a high color value, as well as especially superior dry or wet crock fastness can be obtained. The printed parts also are outstanding in "handling."

*Example 6*

With 50 parts of the brominated poly-2-chlorobutadiene emulsion of Example 1, 10 parts of an aqueous paste containing 25% yellow pigment is mixed, and then 30 parts of the O/W type emulsion of dimeric acid ester (obtained by adding 0.05 part of cobalt naphthoate, 2 parts of O/W-emulsifiable polyethylene glycol lauryl ether and 38 parts of water to a solution of 10 parts of polymeric fatty acid (dimeric acid) in 50 parts of kerosine, with stirring) also added. To the mixture, 3 parts of sodium acetate and 7 parts of water (or O/W type emulsion comprising water, kerosine and the emulsifying agents of Example 1) are added, with stirring, thereby to have a printing paste. The obtained paste can produce the printed articles having a brilliant shade, a high color value and good dry or wet crock fastness, as well as good fastness against laundry, the printed parts of the said articles being outstanding in "handling."

*Example 7*

To 60 parts of the brominated poly-2-chlorobutadiene emulsion of Example 1, 10 parts of an aqueous paste containing 30% orange color pigment and 8 parts of methylated dimethylol urea (50% aqueous solution) are added. Thereto, 22 parts of water (or O/W type emulsion comprising water, kerosine and the emulsifiers of Example 1) also is added with stirring, thereby to have a printing paste. The obtained printing paste can produce printed articles having a brilliant shade, a high color value and good dry or wet crock fastness, after the heat treatment as described in Example 1. The printed parts of the said articles are outstanding in "handling."

*Example 8*

One hundred parts of poly-2-chlorobutadiene is dissolved in 280 parts of monochlorobenzene. To the resulting solution while stirred at 30°–35° C., 15.6 parts of bromine is added. The reaction is continued for 4 hours, at the end of which a poly-2-chlorobutadiene solution having the degree of bromination of 8.5 mol percent is obtained. After removal of the unreacted bromine from the solution under reduced pressure, 232.4 parts of kerosine and 5 parts of barium-cadmium complex soap (Advastab BC–100J, manufactured by Toa Rika-Kogyo-sho) are added thereto with stirring, thereby to have a solution containing 21% solids. The brominated poly-2-chlorobutadiene solution thus obtained is emulsified followingly: By means of a homo-mixer, 6.4 parts of polyethylene glycol distearate and 5 parts of polyethylene glycol lauryl ether are dissolved in 358 parts of water. To the resulting solution, 628 parts of the brominated poly-2-chlorobutadiene solution is slowly added, thereby to have O/W type emulsion of the brominated poly-2-chlorobutadiene. To 30 parts of the brominated poly-2-chlorobutadiene emulsion, 10 parts of an aqueous paste containing 25% yellow pigment is added, and 8 parts of ethylene glycol-modified cationic melamine resin solution, 5 parts of urea and 47 parts of O/W type emulsion (prepared from water, kerosine and the aforesaid emulsifying agents) are added to have a printing paste. The printing paste is then applied to cellulosic fabric material which is then followed by heat treatment at 120°–130° C. for 3 minutes and soaping, as well as water-washing. The printed fabric material has a brilliant shade, a high color value and good dry or wet crock fastness.

The above-said ethyleneglycol-modified melamine resin solution is prepared as follows: 401 parts of 37% formaline, 189 parts of melamine and a small amount of N-caustic soda are mixed and the resulting suspension is adjusted at pH 8. The suspension is heated at 90° C., and, at this temperature, the reaction is continued for 45 minutes. At the end of that time, the reaction mixture reaches hydrophobic point of 0° C. (white turbidity occurs upon the introduction of one drop of the reaction mixture into ice water). Then 815 parts of 37% formaline and 90 parts of diethylene triamine, together with concentrated hydrochloric acid, are added to have the total mixture adjusted at pH 3. After polycondensation at 55° C. for several hours, the mixture shows Weisenberg's effect. To dissolve this mixture, 973 parts of ethylene glycol is added, and the reaction is effected at 55° C. and at pH 3 for 30 minutes. The resulting solution is neutralized at pH 7 with 10 N-caustic soda, thereby to have the desired ethylene glycol-modified cationic melamine resin solution.

*Example 9*

To 50 parts of the brominated poly-2-chlorobutadiene emulsion of Example 8, 10 parts of an aqueous paste containing 30% green color pigment of copper phthalocyanin type, 5 parts of urea and 8 parts of the ethylene glycol-modified cationic melamine resin solution of Example 8, and then 27 parts of O/W-type emulsion (prepared from water, kerosine and the emulsifying agents of Example 8) are mixed with stirring, thereby to have a printing paste.

The printing paste thus obtained is applicable not only to cellulosic material but also to fiber materials of polyamide, polyester, polyacrylic and polypropylene types. According to the heat treatment of Example 8, printed fabric materials having a brilliant shade, a high color value, good crock fastness, and fastness against water-washing, is obtained.

*Example 10*

To 20 parts of the brominated poly-2-chlorobutadiene emulsion of Example 8, 10 parts of an aqueous paste containing 30% yellow pigment, 8 parts of ethylene glycol-modified cationic melamine resin solution and 5 parts of butadiene-acrylonitrile (67:33 by weight) copolymeric latex (42% solids), and then 57 parts of O/W-type emulsion comprising water, kerosine and the emulsifying agents of Example 8 are added in the sequence, with stirring, thereby to have a printing paste.

The printing paste is printed to polyester-type fabric which is then followed by heat-treatment at 160° C. for 2 or 3 minutes. The fabric has a brilliant shade, a high color value and good dry or wet crock fastness, as well as good fastness against heavy water-washing.

*Example 11*

To the formulation of Example 9, 10 parts of a 1:1 mixed liquid of stannous chloride and 30% acetic acid are added, whereby a resisting paste of naphthol dye is obtained. This paste is used as follows:

The dye resisting paste is printed to a cloth having been dipped with sodium salt of 2,3-oxynaphthoic acid anilide. After subjecting to cylinder-drying, the cloth is passed through a solution of the diazonium salt of p-nitro-O-toluidine, washed with water, treated with a bisulfite and then with a hot alkali, and then subjected to soaping, whereby green color resist dyeing is effected on naphthol ground. "Handling," dry or wet crock fastness and fastness against washing are satisfactory.

*Example 12*

To the formulation of Example 9, 8 parts of tartaric acid is added whereby a dye resist paste of Variamin Blue is obtained. This paste is applied onto a cloth having been dipped with a solution of Na-salt of 2,3-hydroxynaphthoic acid anilide and dried. The cloth is cylinder-dried and passed through a solution of the diazonium salt of 4'-methoxy-4-amino-diphenyl amine sulfate, followed by the after-treatment of Example 11, whereby brilliant green color resist dyeing is effected on naphthol ground. "Handling," dry crock fastness and fastness against washing are satisfactory.

*Example 13*

To 15 parts of the brominated poly-2-chlorobutadiene solution of Example 8, 37 parts of kerosine is added. To the resulting solution, 1 part of polyethyleneglycol lauryl ether, 35 parts of water, 9 parts of the ethylene glycol-modified cationic melamine resin solution of Example 9 and 3 parts of urea are added in the sequence, with stirring by means of a homo-mixer, whereby O/W-type emulsion is obtained. To 90 parts of the emulsion containing the brominated poly-2-chlorobutadiene and ethylene glycol-modified cationic melamine resin, 10 parts of an aqueous paste of 35% yellow pigment are added while stirring, thereby to have a printing paste.

The printing paste is printed onto a fabric of polyester type (mixed-woven from 65% Tetron and 35% cotton), which, after drying, is followed by heat treatment at 150° C. for 3 minutes. The printed fabric has good fastness against washing.

*Example 14*

One hundred and thirty-eight parts of poly-2-chlorobutadiene are dissolved in 510 parts of monochlorobenzene. To the solution while stirred at 28° C., 8.8 parts of bromine is added. While continuing stirring for 3 hours, the solution containing 24% of the brominated poly-2-chlorobutadiene with the degree of bromination of 3.0 mol percent is obtained. To 30 parts of this solution, 25 parts of kerosine and 2 parts of polyoxyethylene lauryl ether are added with stirring, and finally 30 parts of butadiene-acrylonitrile (67:33 by weight) copolymeric latex (42% solids) is added, whereby a viscous O/W-type white emulsion paste is obtained.

To 30 parts of the obtained emulsion paste, 20 parts of water, 4 parts of urea, 9 parts of polyhydric alcohol-modified cationic melamine resin solution, 8 parts of 6% aqueous solution of polyoxyethylene distearate and 2 parts of polyoxyethylene lauryl ether are added. By stirring the mixture by means of a homo-mixer, 27 parts of kerosine is added, whereby O/W-type emulsion of the brominated poly-2-chlorobutadiene and polyhydric alcohol-modified cationic melamine resin is obtained. To the emulsion (90 parts), 10 parts of an aqueous paste containing 25% red pigment is added with stirring, thereby to have a printing paste.

The printing paste is printed onto a cellulosic fabric material, followed by the heat treatment at 130° C. for 3 minutes. The printed material obtained has a brilliant shade, a high color value and dry or wet crock fastness, as well as good fastness against laundry.

The polyhydric alcohol-modified cationic melamine resin solution used above is prepared by the following way: 306 parts of 30% formaline, 144 parts of melamine and a small amount of 5 N caustic soda are mixed, and the resulting suspension is adjusted to pH 7.5. After the suspension is heated at 90° C. until it has reached the hydrophobic point of 0° C., 621 parts of 37% formaline and 69 parts of 3,3'-imino-bis-propyl amine, together with concentrated hydrochloric acid, are added to have the suspension adjusted at pH 4. Through polycondensation at 70° C. for several hours, the reaction mixture becomes a gel. To dissolve it, 741 parts of glycerol is added. The reaction is continued at 70° C. under pH 6.5 for one hour. Thereafter, the reaction mixture is neutralized with 10 N caustic soda to have the desired modified cationic melamine resin solution.

*Example 15*

The printing paste of Example 14 is printed onto cellulosic fiber material which, after drying, is dipped into an aqueous solution containing 10 cc./l. of 40° Bé. sodium hydroxide at 80°-82° C. for 1 minute. Thereafter, the material is finished by water-washing and drying. Similarly as in the case of thermal fixation, the printed material has a brilliant shade, a high color value and dry or wet crock fastness, as well as good fastness against laundry.

*Example 16*

Thirty parts of poly-2-chlorobutadiene is dissolved in 81 parts of monochlorobenzene, and to the resulted solution, 6 parts of bromine is added at 29°-31° C. The reaction is completed within a period of about four hours and forty minutes. Brominated poly-2-chlorobutadiene having the degree of bromination of 11.0 mol percent is obtained. After removing unreacted bromine therefrom under reduced pressure, 0.6 part of ethylene glycol glycidyl ether and 0.6 part of barium-cadmium complex soap (Advastab BC-100J, manufactured by Toa-Yuka-Kogyo-sho) are added to have a solution having 28% solids. From 30 parts of this solution, O/W type emulsion is obtained in the same manner as in Example 14.

Polyhydric alcohol-modified cationic melamine resin is prepared by the following way. A mixture of 26.8 parts of 37% formaline and 12.6 parts of melamine is adjusted at pH 7.9 with 5 N sodium hydroxide. The reaction is brought into reaction at 90°±2° C. until it reaches the hydrophobic point. (The time required may be about one hour.) After the reaction, 54.3 parts of 37% formaline is added to the reaction mixture, which is then cooled to 50° C. To the reaction mixture, 12.5 parts of the reaction product, obtained by the reaction of 37 parts of the triethanol amine, 60.9 parts of 37% formaline and 27 parts of 35% hydrochloric acid at 95°-100° C. for two hours, and 2.5 parts of diethylenetriamine are added. The resulting mixture is adjusted at pH 4.5 with 35% hydrochloric acid. The reaction is continued at 55°±1° C. until it exhibits Weisenberg's effect (about one hour). Then, 32.5 parts of ethylene glycol is added, and the total reaction is conducted at 55°±1° C. for 2 hours. After completion of the reaction, the said mixture is adjusted at pH 7.2 with 5 N sodium hydroxide, thereby to have desired polyhydric alcohol-modified cationic melamine resin.

To 9 parts of the polyhydric alcohol-modified cationic melamine resin solution, 35 parts of the O/W type emulsion of the brominated poly-2-chlorobutadiene, 10 parts of an aqueous paste containing 25% orange color pigment and 46 parts of the O/W type emulsion (as viscosity-increasing agent, comprising water, kerosine and an emulsifier) are added with stirring, thereby to have a printing paste. Through the heat treatment of Example 13, the printing paste thus obtained can produce printed polyester fiber material having a brilliant shade, a high color value and softness, as well as good crock fastness and fastness against laundry.

*Example 17*

The printing paste of Example 16 is applied to cellulosic fiber material according to alkali-setting process as mentioned in Example 15. The printed material having a brilliant shade, a high color value and softy 'handling," as well as good crock fastness and fastness against laundry.

*Example 18*

Forty parts of poly-2-chlorobutadiene is dissolved in 160 parts of monochlorobenzene. To the resulting solution, 14.6 parts of bromine is added dropwise. The reaction is continued at 30°-32° C. for 5 hours. The bromination product having the degree of bromination of 20.2 mol percent is obtained. As shown in Example 1, unreacted bromine is removed. To the mixture, 1 part of phenyl glycidyl ether as stabilizer is added to have a solution containing 28% solids. To 10 parts of this solution, 37 parts of kerosine, 24 parts of water, 8 parts of 6% aqueous polyethylene glycol distearate solution, 1 part of polyoxyethylene lauryl ether, 9 parts of the polyhydric alcohol-modified cationic melamine resin solution of Example 16 and 5 parts of urea are added in the sequence. By stirring the resulting mixture by means of a home-mixer, O/W type emulsion containing the brominated poly-2-chlorobutadiene and polyhydric alcohol-modified cationic melamine resin is obtained. To the emulsion, 10 parts of an aqueous paste containing 25% green color pigment is added to have a printing paste. The printing paste can yield printed materials having good fastness against laundry, after the treatment according to Example 15.

*Example 19*

To a solution of 43 parts of poly-2-chlorobutadiene in 163 parts of monochlorobenzene, 5.6 parts of bromine is added dropwise at 29°-31° C. After continuing the reaction for 5 hours, 24% solution of brominated poly-2-chlorobutadiene having the degree of bromination of 7.0 mol percent is resulted. To 10 parts of the solution, 37 parts of kerosine, 24 parts of water, 8 parts of 6% aqueous polyethylene glycol distearate solution, 1 part of polyoxyethylene lauryl ether, 10 parts of the polyhydric alcohol-modified cationic melamine resin solution of Example 8, 5 parts of urea and 5 parts of butadiene-acrylonitrile (67:33 by weight) copolymeric latex are added in the sequence. By means of a homo-mixer, the resulting mixture is stirred to form O/W type emulsion. To 90 parts of this emulsion, 10 parts of an aqueous paste containing 30% yellow color pigment is added with stirring to have a printing paste. The obtained paste is printed onto cellulosic fiber material which, after drying, is dipped into an alkali solution (40° Bé. NaOH 10 cc./l.) at 80°-82° C. for about 1 minute and then finished by water washing and drying. The printed material has a brilliant shade, a high color value and good "handling" in the printed parts, and it also has good dry or wet crock fastness and high fastness against laundry.

*Example 20*

The printing paste of Example 19 is applied to polyester type fiber material (mixed-woven from 65% Tetron and 35% cotton), which after drying is heat-treated at 150° C. for 4 minutes, whereby the printed material having a brilliant shade, a high color value and satisfactory "handling," as well as good fastness against washing, is obtained.

*Example 21*

The printing paste of Example 19 is applied to polypropylene fiber materials (100% polypropylene fabric and 50% polypropylene-50% cotton mixed woven fabric). These fiber materials are dried and then treated by heat at 130° C. for 3 minutes, whereby the printed material having a brilliant shade, a high color value, soft "handling" and good crock fastness.

*Example 22*

To 10 parts of the brominated poly-2-chlorobutadiene solution of Example 8, 20 parts of kerosene and 3 parts of sorbitan monooleate (Emasol 410, manufactured by Kao Soap Mfg. Co., Ltd.) are added with stirring by means of a homo-mixer. To the resulting solution while stirred, a mixture of 9 parts of the polyhydric alcohol-modified cationic melamine resin solution of Example 8, 5 parts of butadiene-acrylonitrile (67:33) copolymeric latex, 4 parts of urea and 49 parts of water is added slowly, whereby W/O type emulsion containing the brominated poly-2-chlorobutadiene and polyhydric alcohol-modified cationic melamine resin is obtained. To 90 parts of the W/O type emulsion, 10 parts of an oily paste containing 30% green color pigment of copper phthalocyanine type is added with stirring, thereby to have a printing paste.

The printing paste is printed to cellulosic fiber material which, after dryiing, is subjected to heat-treatment at 130° C. for 3 minutes, whereby the printed material having a brilliant shade, a high color value, excellent "handling" in the printed parts and good dry or wet crock fastness.

What we claim is:

1. A pigment resin printing paste comprising, as binder resin component, a vinyl polymer having active bromine atoms, and as cross-linking agent at least one polybasic compound selected from the group consisting of ethylene diamine, diethylene triamine, triethylene tetramine, tetraethylene pentamine, 3,3'-imino-bis-propylamine, tris-(3-aminopropyl) amine, 1,4-diaminobutane, 3,3'-methyl-imino-bis-propyl amine, N - (3 - hydroxypropyl) - aminopropyl amine, N-(2-hydroxyethyl) aminopropyl amine, a cationic melamine-formaldehyde resin, a polyol-modified melamine-formaldehyde resin and combination of the same, said polymer containing more than 50 mol percent of polymeric 1,3-diolefinic monomer units having the following general formula:

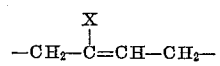

wherein X represents a member selected from the group consisting of hydrogen, chlorine and bromine atoms and a methyl radical, which has been partially brominated, and up to 50 mol percent of polymeric ethylenically unsaturated monomer units in the molecule, said brominated portion of the polymeric 1,3-diolefinic monomer units being in an amount of 3–25 mol percent, based on the total monomer units in the molecule and having the following structural formula:

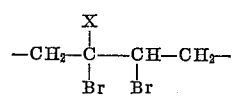

wherein X represents a member selected from the group consisting of hydrogen, chlorine and bromine atoms and a methyl radical, and said polybasic compound being present in an amount effective to cross-link said vinyl polymer and up to a weight equal to the weight of said vinyl polymer present.

2. A pigment resin printing paste as defined in claim 1 wherein the said polybasic compound is an aliphatic polymine.

3. A pigment resin printing paste as defined in claim 1, wherein the said polybasic compound is a cationic melamine-formaldehyde resin composition.

4. A pigment resin printing paste as defined in claim 1, wherein the said polybasic compound is a polyol-modified cationic melamine-formaldehyde resin composition.

5. A pigment resin printing paste as defined in claim 1, wherein a thermoplastic resin latex is contained additionally, as auxiliary binder.

6. A pigment resin printing paste as defined in claim 1, wherein urea is contained additionally, as buffer agent.

7. A textile material printed by using a pigment resin printing paste defined in claim 1.

8. A mixed-woven textile material of polyester synthetic fiber and cotton printed by using a pigment resin printing paste as defined in claim 1.

9. A polypropylene fiber-containing textile material printed by using a pigment resin printing paste as defined in claim 1.

References Cited by the Examiner

UNITED STATES PATENTS

| 2,066,331 | 1/37 | Carothers et al. | 260—29.7 |
| 2,067,172 | 1/37 | Carothers | 260—96 |
| 2,364,186 | 12/44 | Bersworth | 260—94.7 |
| 2,900,354 | 8/59 | Auer et al. | 260—29.4 |

OTHER REFERENCES

Speel et al.: "Textile Chemicals and Auxiliaries," 2nd edition, Reinhold Publishing Corp., New York, page 479.

MURRAY TILLMAN, *Primary Examiner.*

LEON BERCOVITZ, *Examiner.*